April 5, 1938.  L. J. SPARROWHAWK  2,113,435

BRAKE EQUALIZER

Original Filed May 14, 1934  3 Sheets-Sheet 1

INVENTOR.

Laurence J. Sparrowhawk

BY Lancaster, Allwine and Rommel

ATTORNEYS

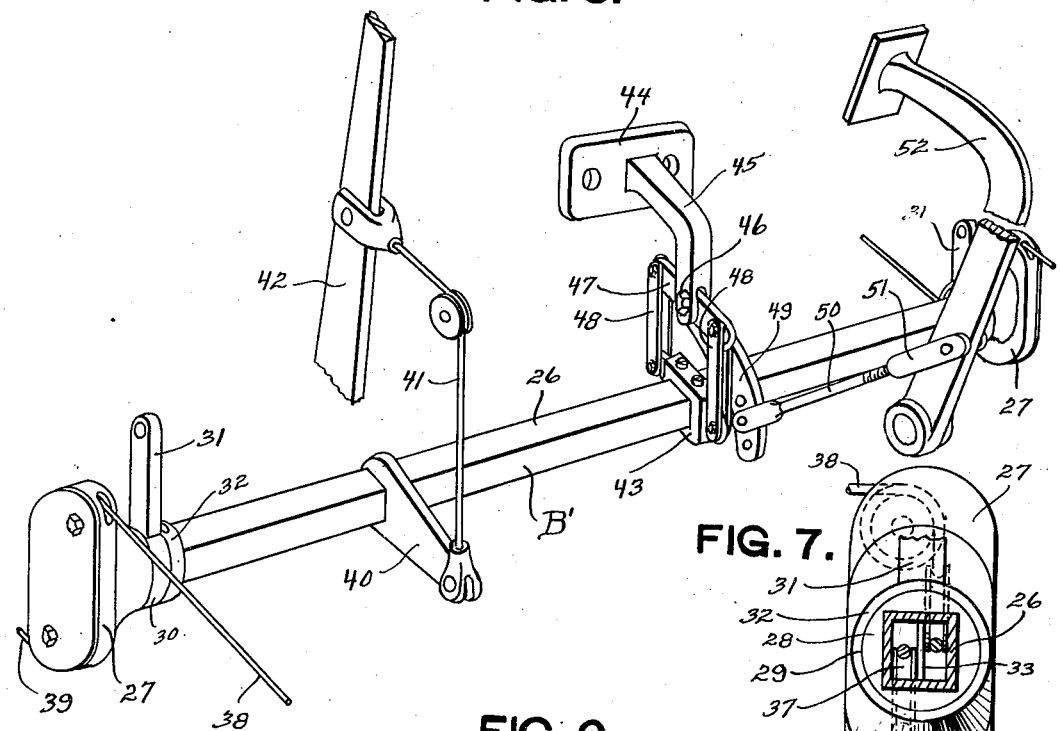
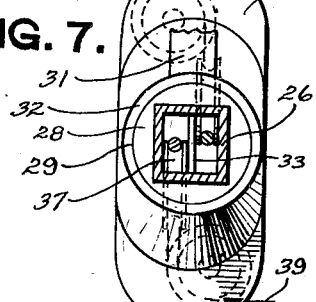
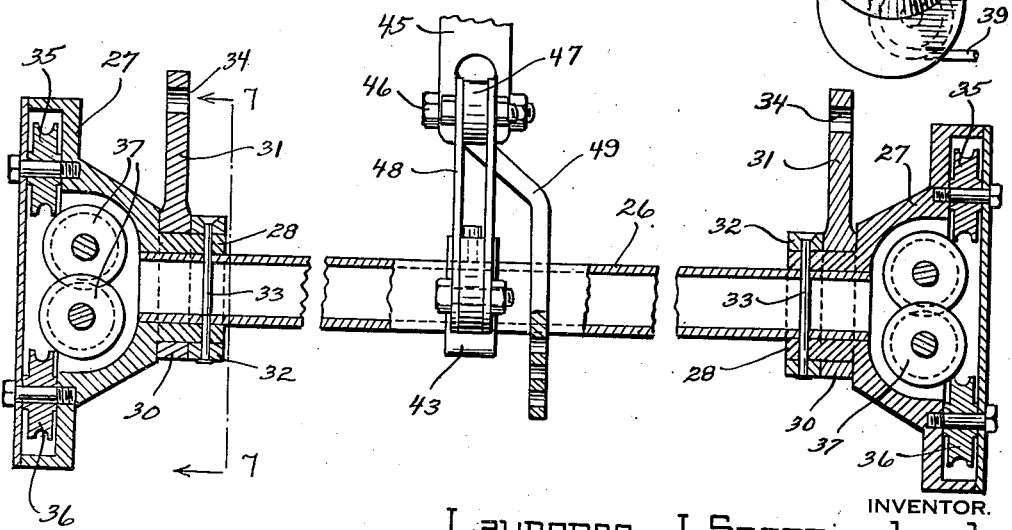

April 5, 1938.  L. J. SPARROWHAWK  2,113,435
BRAKE EQUALIZER
Original Filed May 14, 1934   3 Sheets-Sheet 3

INVENTOR.
Laurence J. Sparrowhawk

BY Lancaster, Allwine and Rommel
ATTORNEYS.

Patented Apr. 5, 1938

2,113,435

UNITED STATES PATENT OFFICE 2,113,435

BRAKE EQUALIZER

Laurence J. Sparrowhawk, Tampa, Fla.

Application May 14, 1934, Serial No. 725,648
Renewed August 23, 1937

6 Claims. (Cl. 188—204)

The present invention relates to brake operating means for motor vehicles and is a continuation in part of my co-pending application, Serial Number 676,400 filed June 17, 1933 for a Triple control system for motor vehicles.

The primary object of the present invention resides in the provision of improved manually controlled brake operating means for motor vehicles embodying an arrangement for equalizing the braking pressure applied to all four wheels of the vehicle.

A further object of the invention is to provide a vehicle brake operating means wherein an even braking force will be maintained upon each wheel should one of the vehicle springs become broken and allowing displacement of one of the vehicle axles.

A further object resides in the arrangement for maintaining perfect equalization of the two rear brakes upon failure of the operating connections to the two front brakes, and perfect equalization of the two front brakes upon failure of the operating connections to the two rear brakes.

A still further object of the invention is to provide improved brake equalizer mechanism of this character which may be applied to existing types of vehicle constructions and operated by means of the usual brake pedal.

Other objects and advantages of the invention will be apparent during the course of the following detailed description taken in connection with the accompanying drawings forming a part of this specification and in which drawings:—

Figure 5 is a perspective view showing a modified form of brake equalizing means from that shown in Figure 2.

Figure 6 is an enlarged longitudinal section thru the equalizer tube shown in Figure 5.

Figure 7 is a sectional view on the line 7—7 of Figure 6.

In the drawings, like reference characters designate corresponding parts thruout the several views.

Figure 1:
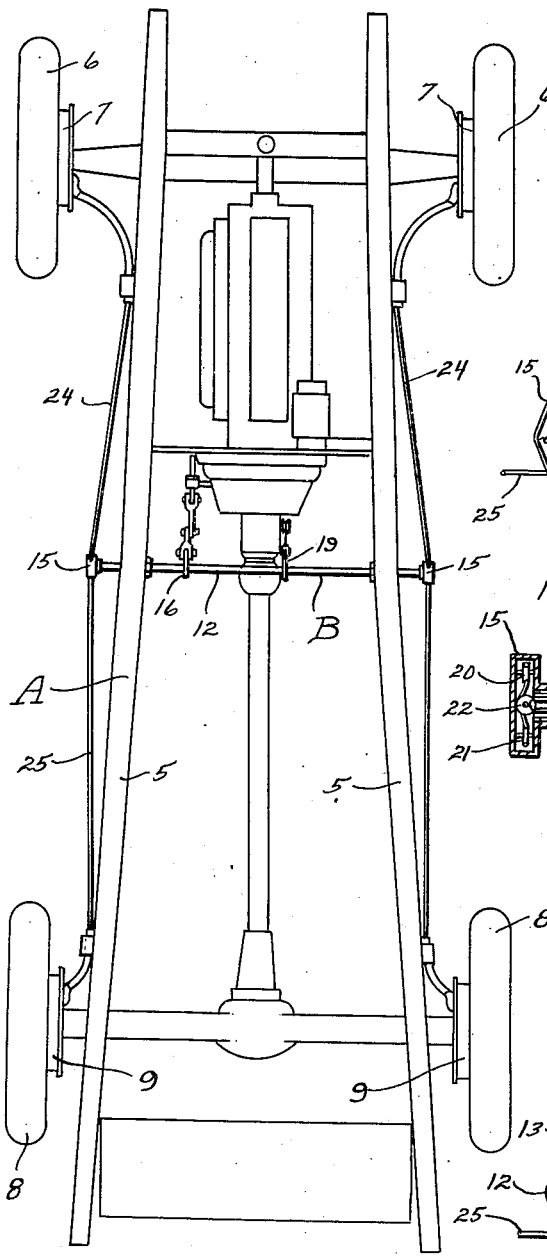
Figure 1 is a plan view of a vehicle chassis provided with the brake equalizing means.

Referring first to the form of the invention as disclosed in Figures 1 to 4 inclusive, the vehicle chassis A comprises a frame embodying side rails 5, the frame being supported at its forward end by the front wheels 6 each provided with a brake 7, and at its rear end by the rear wheels 8 each provided with a brake 9. In the form of vehicle construction shown in Figure 1, the usual brake rods or cables extend substantially parallel to the side rails 5 for operating the brakes 7 and 9.

The invention as disclosed herein provides a manually controlled brake operating mechanism B arranged substantially midway between the front and rear ends of the vehicle chassis and serves to equalize the braking pressure applied to the four wheels of the vehicle.

Referring now to the construction and operation of the brake equalizer B, the same is intended to be controlled by either the foot brake pedal 10 or the hand lever 11. The equalizing device B comprises a brake equalizer cross tube 12 suspended from the frame rails 5 by means of suitable links 13 which are pivotally connected at their upper ends as at 14 to permit swinging movement of the cross tube forwardly and rearwardly of the vehicle in a direction toward and from the brakes 7 or 9. The cross tube is freely rotatably in the lower portions of the links 13 and is provided at each end with a suitable casing or housing 15 having communication with the open ends of the tube. These housings or casings 15 as will be observed in Figures 2 and 3 have their major axes extending substantially vertically with the ends of the casings extending above and below the cross tube. Rigidly secured at one end to the tube 12 is a lever arm 16 connected by links 17 and 18 to the pivoted brake pedal 10. Secured also at one end to the tube 12 is a second lever arm 19 which is preferably connected by means of the cable or other flexible coupling 20 to the hand lever 11. These lever arms 16 and 19 preferably extend from the cross tube in a direction at a right angle to the major axis of the end casings 15 so that an upward pull is exerted upon the lever arms by their operating elements 10 and 11. Thus it will be seen that the cross tube 12 may be rotated in the suspending links 13 and also permitted to swing bodily by means of the pivots 14.

Journaled in the upper portion of each end casing 15 above the axis of the tube 12 is a pulley 20, while journaled in the lower portion of each casing below the axis of the tube is a pulley 21. Journaled also in each of the casings 15 in alignment with the ends of the cross tube 12 are double or twin pulleys 22 arranged to rotate on an axis at a right angle to the axis of the cross tube.

Figure 4:
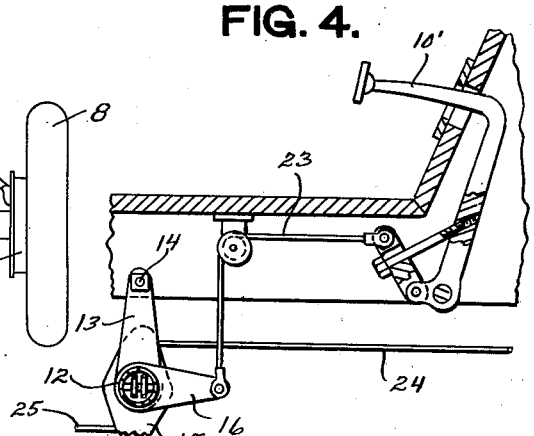
Figure 4 is a fragmentary detail view showing a slightly modified form of coupling arrangement between the brake pedal and the equalizer cross tube from that shown in Figure 2.
Figure 8:
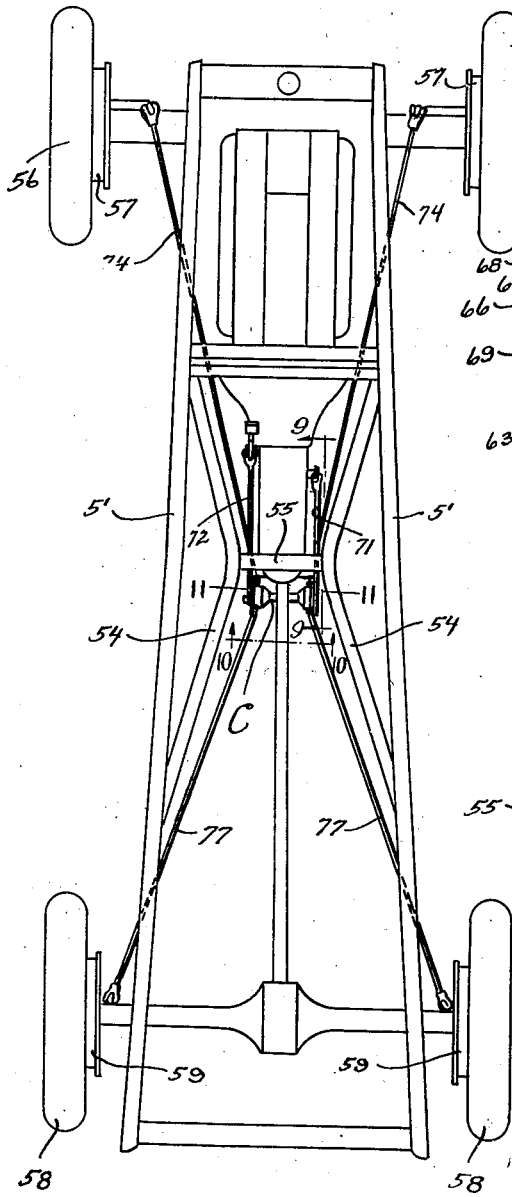
Figure 8 is a plan view of a vehicle chassis showing the equalizer means applied to that form of chassis wherein the brake rods converge toward the center of the chassis.
Figure 9:
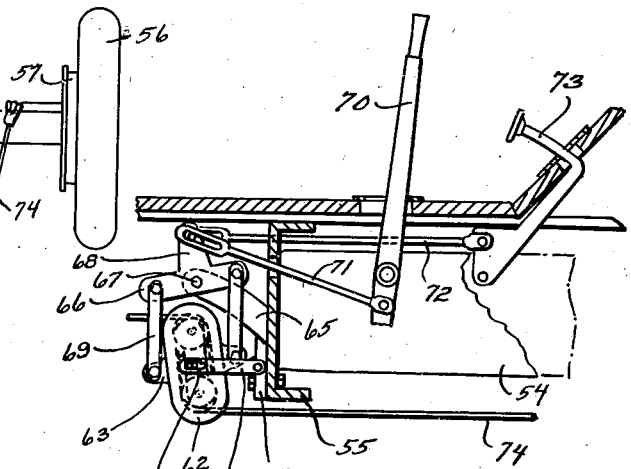
Figure 9 is an enlarged fragmentary detail view taken longitudinally of the chassis on the line 9—9 in Figure 8 and looking at one end of the brake equalizer.
Figure 10:
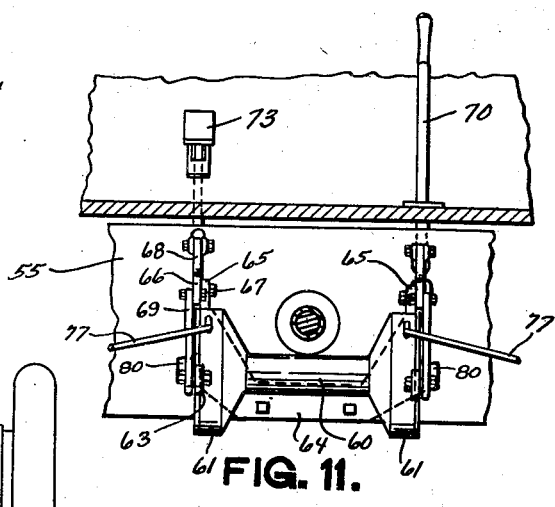
Figure 10 is an enlarged detail sectional view thru the chassis on the line 10—10 in Figure 8 and looking at the rear of the equalizer.

In the arrangement shown in Figure 4, the foot brake pedal 10' is connected by means of a cable 23 to the lever arm 16. This arrangement permits mounting of the brake equalizer cross tube 12 at various points on the vehicle frame so as to clear obstructions such as the transmission, drive shaft, etc.

Operatively connected between the front brakes 7 and the equalizer B is a front brake cable 24, while operatively connected between the rear brakes 9 and the equalizer is a rear brake cable 25. The intermediate portion of the front brake cable 24 extends longitudinally thru the cross tube 12 and over the pulleys 22 then upwardly over the upper pulleys 20. From the pulleys 20 the end portions of the cable 24 extend forwardly along the rails 5 and are attached one to each of the front brakes 7. The intermediate portion of the rear brake cable 25 extends longitudinally thru the cross tube 12 and over the pulleys 22 then downwardly over the lower pulleys 21. From the pulleys 21 the end portions of the cable 25 extend rearwardly along the rails 5 and are attached to the rear brakes 9. Thus it will be seen that the operating cable for the front brake extends from one of the front brakes thru the equalizer and then to the opposite front brake, while the operating cable for the rear brakes extends from one of the rear brakes thru the equalizer and then to the other rear brake. By so having the intermediate portions of the cables 24 and 25 freely movable thru the equalizer, the tensioning force at the end of each cable will be equalized. By having the equalizer pivotally suspended to permit movement forwardly and rearwardly of the vehicle will allow for equalizing the tension between the front and rear cables so that an equal brake applying force is applied to the front and rear brakes.

Figure 2:
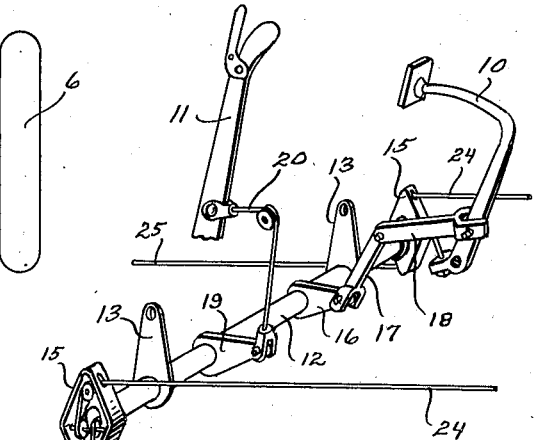
Figure 2 is a perspective view of the brake equalizing means and showing one manner of operatively connecting the same for actuation by either the brake pedal or the brake lever.
Figure 3:
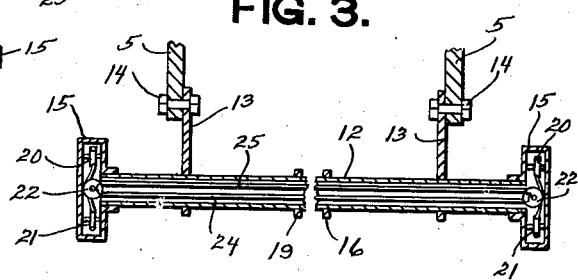
Figure 3 is an enlarged longitudinal section thru the brake equalizer cross tube and showing the manner of pendently suspending the tube.

In operation, when the pedal 10 is pressed downwardly for applying the brakes, the cross tube 12, considering Figure 2, will be rotated in links or hangers 13 in a counter-clockwise direction and exert a rearward pull on the front brake cable 24 and a forward pull on the rear brake cable 25. Should the tension, say on the cable 24 be slightly greater than that on the cable 25, the cross tube 12 will be swung forwardly slightly on the pivot 14 until the tension between the cables 24 and 25 is equalized. When installing the brake equalizer, the cables 24 and 25 are adjusted so that the major axes of the casings 15 will be substantially at a right angle to the cable portions extending from the casings when the brakes are applied.

Referring now to the form of equalizer shown in Figures 5, 6, and 7, the same is intended to be suspended transversely of the vehicle frame similar to the equalizer shown in Figure 1. The brake equalizer B' embodies a brake equalizer cross tube 26 of hollow square shape in cross section and provided at each end with a casing or housing 27. Each of the casings 27 is provided with a hollow hub portion 28 adapted to receive the ends of the square cross tube 26. These hollow hub portions 28 are provided with cylindrical outer surfaces 29 which form bearings for the annular or ring-shaped lower ends 30 of suspending links or hangers 31 whereby the cross tube 26 and the casings 27 are permitted to rotate. The links 31 are held against displacement by means of retaining rings 32 secured in position by pins 33 and which pins also serve to connect the casings 27 to the cross tube 26. The upper ends of the links 31 may be apertured as at 34 to receive pivot bolts serving to connect the links to a suitable portion of the vehicle frame and permit swinging of the cross tube forwardly and rearwardly of the vehicle.

Journaled in the upper portion of each casing 27 above the axis of the tube 26 is a pulley 35, while journaled in the lower portion of each casing 27 below the axis of the tube 26 is a pulley 36. Journaled also in each of the casings 27, one for each of the pulleys 35 and 36, are pulleys 37 so arranged as to guide the brake cables longitudinally thru the tube 26. These pulleys 37 are rotatable on axes at a right angle to the axis of the tube 26. The front brake cable 38 has its intermediate portion trained over the upper pulleys 35 and upper ones of the pulleys 37, while the rear brake cable 39 has its intermediate portion trained over the lower pulleys 36 and the lower ones of the pulleys 37.

Secured in any preferred manner to the cross tube 26 is a lever arm 40 which may be connected by a cable 41 to a hand lever 42 which may be actuated to impart rotary movement to the cross tube for tensioning the brake cables 38 and 39.

Secured in any preferred manner to the cross tube 26 is a coupling member or block 43 having its major axis extending at a right angle to the major axis of the casings 27. Adapted for attachment to a suitable portion of the vehicle frame to extend above the coupling member 43 is a pivot bracket 44 having an arm 45 upon which is centrally pivoted as upon the pivot bolt 46, a rocking lever 47. The ends of this rocking lever 47 are connected by means of links 48 to the ends of the coupling member 43 whereby upon vertical movement of the lever 47 the links 48 cause a corresponding vertical swinging of the coupling member 43 and impart rotation to the cross tube 26. Thus the rotating force applied to the tube 26 is in a direction substantially at a right angle to the direction of pull upon the brake cables 38 and 39.

Rigidly secured at one end to the intermediate portion of the rocking lever 47 is a lever arm 49 which is offset to one side as shown in Figure 6 to clear the links 48 and then curved forwardly over the tube 26. Pivotally secured at one end to the downturned free end of this lever arm 49 is a rod 50 having its opposite end threaded into a clevis 51 pivotally connected to the brake pedal 52. When the brake pedal 52 is pressed forwardly, the rod 50 exerts a pull on the lever arm 49 and rocks the intermediately pivoted lever 47 in a vertical direction about its pivot 46. The links 48 will allow for the cross tube 26 to have lateral motion and thereby balance the tension between the front and rear brake cables 38 and 39 respectively.

In the form of invention disclosed in Figures 8 to 11, the brake equalizer has been shown applied to that type of vehicle frame termed the X type frame and embodying two rail members 54 arranged inwardly of the main side rails 5' and forming an X brace. These rail members 54 converge to the central portion of the vehicle frame and are connected at their nearest point by a frame cross member 55. In this type of vehicle frame the brake rods for the front and rear brakes converge toward the center portion of the vehicle frame substantially in the manner shown in Figure 8. The front wheels 56 are provided with the front wheel brakes 57, while the rear wheels 58 are provided with the rear wheel brakes 59. The brake equalizer designated as a whole by the letter C is adapted for mounting between the rail members 54 at the rear of the cross member 55.

This brake equalizer C embodies a brake equalizer cross tube 60 provided at each of its ends with a housing or casing 61. These casings 61 are closed by end cover plates 62 which may be formed with ears 63 which project from opposite edges of the end plate midway between the ends of the plate.

Secured to the rear side of the cross frame member 55 is a supporting bracket 64 having a pair of rearwardly extending pivot arms 65 one of which projects above each of the casings 61. Pivotally mounted upon each of the arms 65 above the end casings 61 is an inverted T-lever each embodying a cross arm 66 pivoted midway of its ends as at 67 and an upstanding stem portion 68. Connecting the ends of the cross arms 66 with the ears 63 are links 69 whereby upon pivoting of the T-levers upon their pivot 67, the casings 61, together with the cross tube 60 will be rotated in accordance with direction in which the cross arms 66 are rocked. Thus it will be seen that the operating lever assembly not only serves to rotate the cross tube 60, but also provides means for pendently supporting the cross tube.

The stem portion 68 of one of the T-levers may have connection to a hand lever 70 thru means of a link 71, while the stem 68 of the companion T-lever may be connected by means of a link 72 to a foot brake pedal 73. The links 71 and 72 may have a pin and slot connection with their respective stems 68 to permit independent operation of the equalizer either by the lever 70 or the pedal 73.

Figure 11:
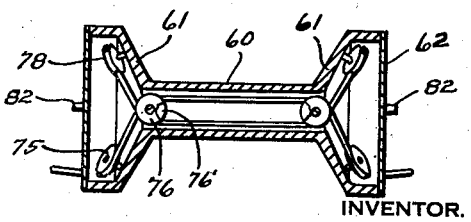
Figure 11 is an enlarged longitudinal section thru the equalizer cross tube on the line 11—11 in Figure 8.

A front brake cable 74 having its ends attached to the front brakes 57, has its central portion trained over pulleys 75 arranged in the lower portion of the casings 61 and over pulleys 76 serving to guide the cable thru the tube 60. The rear brake cable 77 has its ends attached to the rear brakes 59 and its intermediate portion trained over pulleys 78 in the upper portions of the casings 61 and over pulleys 76' serving to guide the cable 77 thru the tube 60. As shown in Figure 11, the pulleys 75 and 78 are set at an angle so as to allow the brake cables 74 and 77 to extend in diverging relation toward their respective brakes.

In the modification shown in Figures 8 to 11, a stop arrangement is shown for confining the travel of forward and backward movement of the rocking cross tube 60 to certain limits. This stop means provides a safety factor and is adapted to come into play in case of failure of some of the operating connections between the equalizer and the front or rear brakes. This stop arrangement embodies a pair of arms 80 anchored at one end to the bracket 64 and extending rearwardly, one at the outer side of each of the end cover plates 62. The rear ends of the arms 80 are slotted as at 81 in Figure 9 and these slots receive pins 82 projecting from the end plates in axial alignment with the cross tube 60. By observing Figure 9 it will be seen that forward and rearward movement of the equalizer cross tube will be limited to the length of the slots 81.

With this motion limiting means for the equalizer, in case of failure of the front pair of brakes 57, such for instance as thru the front brake cable 74 becoming disconnected, the equalizer would swing rearwardly for its limit of movement in the slotted stop arms 80 so that when the brake control 70 or 73 is operated the entire braking force will be applied with an equalized braking pressure upon the two rear brakes. Likewise, upon failure of the rear pair of brakes, the equalizer would swing forwardly for its limit of movement and the entire braking force will be applied with an equalized braking pressure upon the two front brakes. Thus the motion limiting means will insure operation of either pair of brakes in case of failure or accident to the other pair.

In all forms of the invention, the equalizer functions to allow for proper application of the brakes should one of the vehicle springs be broken. Under these conditions, the breaking of a front spring would merely result in a slacking off on the brake cables and allow for proper equalized application of all of the brakes without causing swerving or skidding of the vehicle. Breaking of a rear spring would merely result in tightening a little on both of the brake cables and apply an even braking pressure upon all four brakes.

Thus it will be seen that perfect equalization will be had between each of the front brakes and between each of the rear brakes by having the intermediate portions of their respective operating cables freely movable thru the equalizer device, and that equalizing between the front and rear pairs of brakes is achieved by permitting forward and rearward movement of the equalizer device so as to balance the tension between the front and rear brake cables.

Changes in details may be made to the forms of invention herein shown and described, without departing from the spirit of the invention or the scope of the following claims.

I claim:

1. In a vehicle having a pair of front brakes and a pair of rear brakes, brake operating means including a freely rotatable equalizer device, means supporting the equalizer and permitting free swinging movement thereof, a front brake cable and a rear brake cable each having their ends connected to their respective brakes and their intermediate portions movable with frictionless motion thru the equalizer whereby the cables will be equally tensioned thru rotation of the equalizer, and means for rotating the equalizer.

2. In a vehicle having a brake upon each of the front and rear wheels thereof, an equalizer cross member rotatably mounted between the front and rear wheels and having free swinging movement longitudinally of the vehicle, a casing fixed at each end of the cross member, pairs of pulleys journaled in each of said casings, a rear brake cable having its ends attached to the rear brakes and its intermediate portion trained over certain pairs of the pulleys, a front brake cable having its ends attached to the front brakes and its intermediate portion trained over other pairs of said pulleys, one of said cables extending from the equalizer above the rotating axis of the cross member and the other from below the axis thereof, and means for imparting rotation to the cross member and permitting swinging movement thereof.

3. In a vehicle having a brake upon each of the front and rear wheels thereof, brake equalizing means embodying a hollow cross member, means suspending the cross member to have free swinging movement longitudinally of the vehicle and in which the cross member freely rotates, a casing at each end of the cross member, two pairs of pulleys journaled in each casing, a rear brake cable having its intermediate portion trained over one pair of pulleys in each casing and extending thru the cross member with the ends of the cable attached to the rear brakes, a front brake cable having its intermediate portion trained over the other pairs of pulleys in the casings and thru the cross member and having its ends attached to the front brakes, said cables extending from the casings one above and the other from below the rotating axis of the cross member, and means for imparting rotation to the cross member.

4. In a vehicle having a brake upon each of the front and rear wheels thereof, an equalizer cross member, links suspending the cross member to have free swinging movement longitudinally of the vehicle and in which links the cross member is freely rotatable, front and rear brake cables each having their ends attached to their respective brakes and their intermediate portions freely movable thru the cross member to be equally tensioned upon rotation of the cross member, a coupling member secured transversely of the cross member, a rocking lever pivoted midway of its ends above the coupling member, links connecting the ends of the coupling member with the ends of the rocking lever, a lever arm rigid with the rocking lever, and means for imparting swinging movement to the lever arm for rotating the cross member.

5. In a vehicle having a brake upon each of the front and rear wheels thereof, an equalizer cross member, a supporting bracket having a pair of pivot arms extending one above each end of the cross member, a T-lever pivoted upon each of the pivot arms and each embodying a cross arm and an upstanding stem portion, a pair of links connecting the end portions of the cross arms with the end portions of the cross member for imparting rotation to the cross member upon swinging of the T-levers, operating means for the T-levers, and connected to said stems, a brake cable for the front brakes, and a brake cable for the rear brakes, said brake cables having their intermediate portions trained thru the equalizer cross member.

6. In a vehicle having a pair of front brakes and a pair of rear brakes, a tension element connecting each pair of brakes, a tensioning device for said elements and freely rotatable about a horizontal axis for equalizing tension between the brakes of each pair and freely movable longitudinally of the vehicle for equalizing tension between the pairs of brakes, means for rotating the tensioning device, and means for limiting movement of the tensioning device longitudinally of the vehicle.

LAURENCE J. SPARROWHAWK.